Figure 1:
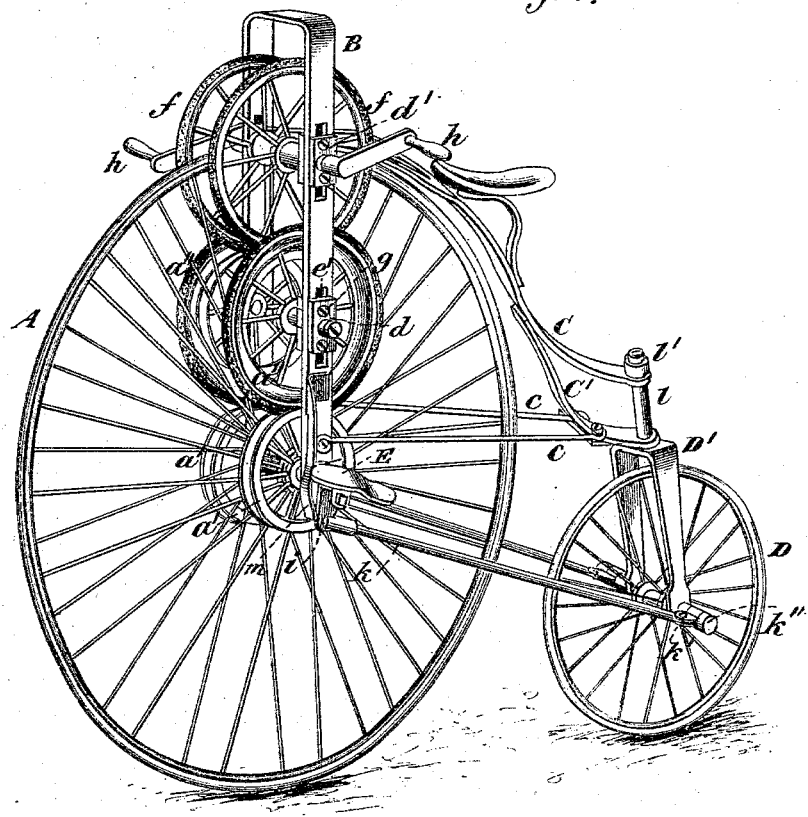

(No Model.) 2 Sheets—Sheet 1.

DE LANCY KENNEDY.
BICYCLE.

No. 287,943. Patented Nov. 6, 1883.

Witnesses.
A. Ruppert.
W. T. Cole

Inventor:
De Lancy Kennedy
by Geo. W. T. Strong
Attys.

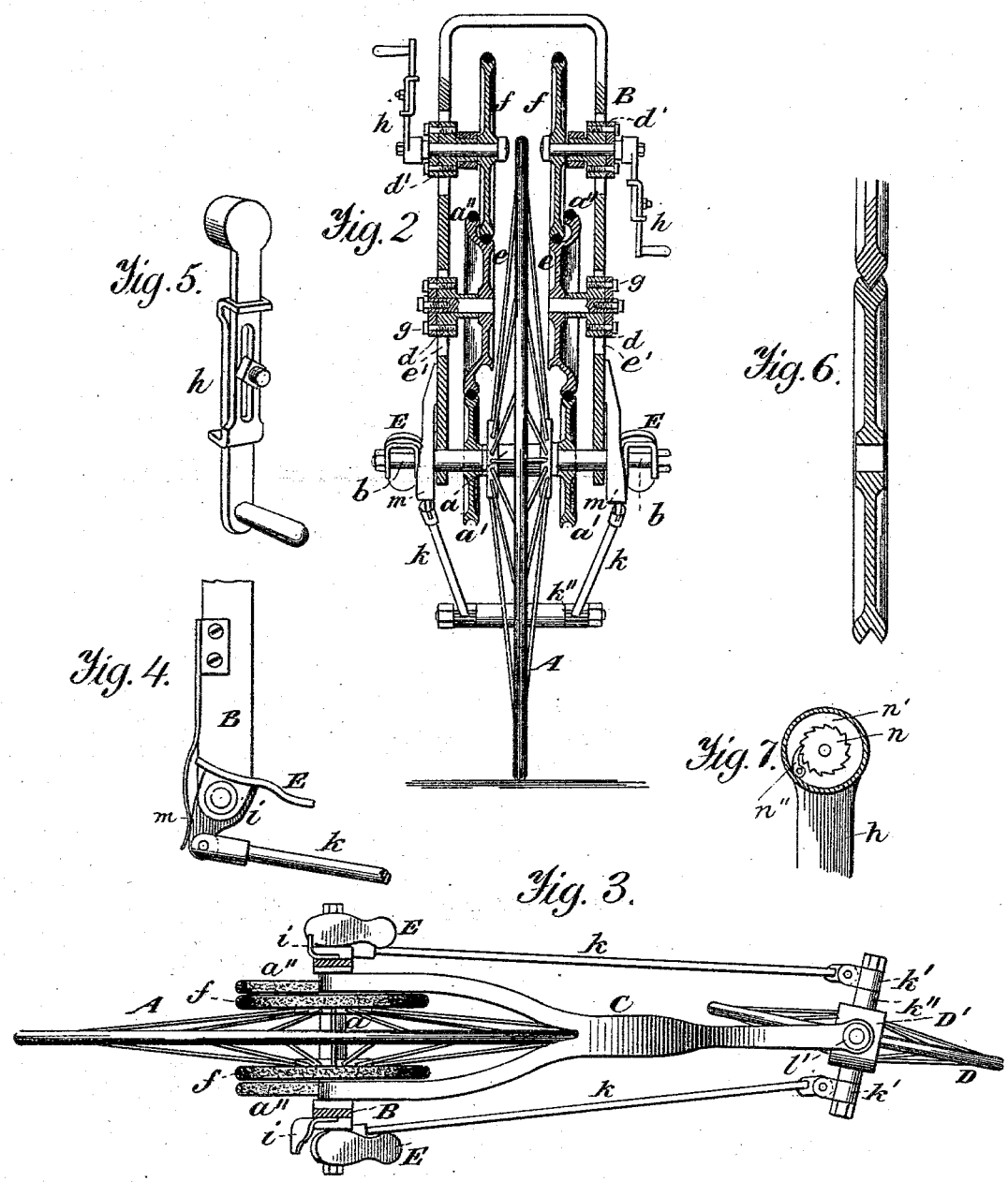

UNITED STATES PATENT OFFICE.

DE LANCY KENNEDY, OF NEW YORK, N. Y.

BICYCLE.

SPECIFICATION forming part of Letters Patent No. 287,943, dated November 6, 1883.

Application filed May 23, 1883. (No model.)

*To all whom it may concern:*

Be it known that I, DE LANCY KENNEDY, of the city, county, and State of New York, have invented certain new and useful Improvements in Bicycles, of which the following is a specification, reference being had to the accompanying drawings, and to the letters of reference marked thereon.

My invention relates to improvements whereby the propelling force may be continuously exerted, and greater speed obtained with the same or less effort than is now required with the ordinary machine, to a novel steering or guiding mechanism, to a system of frictional gearing for communicating the power to the driving-wheel, and to other features of improvement, hereinafter more particularly described.

In the use of the ordinary foot-propelled bicycle it is obvious that only about one-third of the stroke of the crank is effective, the remaining portion of the stroke being an inoperative return movement. This difficulty cannot be avoided in those machines which are propelled by foot. It is also apparent that in order that the rider may conveniently work the cranks the seat must be placed nearly over the center of the main wheel, which throws the center of gravity so far forward as to render the machine dangerous on downgrades or rough roads, or if any obstruction is met with by the wheel. My invention obviates these defects of the ordinary bicycle by dispensing with foot-propelling mechanism and substituting hand-propelling devices therefor, whereby the entire revolution of the crank is made effective, the feet of the rider being only used in steering the machine, and resting upon supports which have subtantially the same function as the common stirrup attached to a riding-saddle. The seat may therefore be placed sufficiently far in the rear of the center of the machine to afford a secure seat for the rider, who can maintain his equilibrium on downgrades or rough roads, and cannot be thrown forward from the machine should the main wheel strike an obstructing object. It will be understood that the fork of the main wheel is not vertically pivoted, this wheel not being used for steering, but that the steering is done by means of the rear or small wheel, whose fork is pivoted, and to which proper connection is made from the foot steering devices.

In the accompanying drawings, Figure 1 is a perspective view, Fig. 2 a vertical section, and Fig. 3 a plan view, of my improved bicycle. Figs. 4, 5, 6, and 7 show detached details and modifications, hereinafter described.

Similar letters of reference indicate similar parts in the respective figures.

A is the main wheel, which is of the ordinary construction. The hub $a$ of the wheel A turns upon a shaft, $b$, supported in bearings in the main fork B.

C is the perch or backbone, which is rigidly attached to the main fork by braces $c$.

D is the smaller or steering wheel.

To the hub $a$ of the main wheel are attached two grooved wheels, $a'$ $a'$, which turn with the main wheel. A rubber-banded wheel, $a''$, enters the groove of each of the wheels $a'$, the wheels $a''$ turning independently of each other, and being mounted in sliding bearings $d$ in the main fork B. The wheels $a''$ $a''$ are each provided with a smaller concentric groove, $e$, in which the independently-turning rubber-banded crank-wheels $f$ work. The wheels $f$ are also mounted in sliding bearings $d'$, supported in the fork B. The bearings $d$ $d'$ of the wheels $a''$ and $f$ move in slots $e'$, cut in the fork, and may be tightened by means of the screws $g$. The shafts of the upper pair of wheels $f$ are provided with hand-cranks $h$, screwed thereon or otherwise suitably secured thereto. The cranks may be made adjustable in length, as shown in Figs. 2 and 5, to vary their stroke as may be desired, or of a determined length, as shown in Fig. 1. In Fig. 5 the crank is made in two slotted interlocking sections united by a screw-bolt.

Upon the shaft $b$ of the main wheel treadles E are loosely mounted, from each of which a short arm, $i$, extends downwardly, and has attached to it a rod, $k$, which unites with a link or strap, $k'$, placed loosely upon the shaft $k''$ of the smaller or steering wheel D. The steering-wheel D is mounted in a fork, D', which has a limited rotary movement upon a vertical pivot supported by the perch or backbone C and the arm C', extending therefrom. The vertical shaft or pivot of the fork D' passes through a sleeve, $l$, which is confined between the perch C and arm C', a nut, $l'$, securing the shaft against vertical movement.

Plate-springs $m\ m$ are fastened to the main fork B, one of the springs pressing against the arm $i$ of each adjacent treadle, so as to maintain the steering-wheel D normally in the longitudinal center line of the machine. The spring $m$ and its use are shown on enlarged scale in Fig. 4.

Fig. 6 shows the friction-gearing with V-grooves, with which rubber tires may or may not be used.

Fig. 7 shows a ratchet-and-pawl arrangement for use with the crank. The ratchet $n$ is fastened on the shaft of the upper friction-wheel, and the hub of the crank chambered at $n'$, and provided with a pawl, $n''$, whereby the crank, when in engagement with the ratchet, will revolve or serve to propel the machine, but may be held to rest the rider as the machine moves downgrade or with acquired momentum. As the upper end of the perch is attached to the shafts of the upper pair of friction-wheels which slide in the slots of the main fork, it is seen that the weight of the rider keeps the entire system of friction-gear pressed together. The wheels may be so relatively arranged with reference to size as to speed the machine to any desired extent consistent with the power.

If desired, both cranks may be made to extend in the same direction from the shaft, instead of in opposite directions, as shown, whereby the healthful motion, as in rowing, may be obtained.

The operation of the machine will be clearly understood from the foregoing. The feet of the rider rest on the treadles, and he thus has a firm support. The slow rotary movement given to the cranks will propel the machine at a high speed, and the guiding is done by simply bearing with greater weight upon one of the treadles, thus moving the rear wheel upon its vertical pivot.

The cranks, if made adjustable in length, as shown in Fig. 5, adapt the machine to different riders or the different requirements of the same rider.

The clutch device illustrated in Fig. 7 is an important feature, but with the crank of variable length need not necessarily be applied to the machine.

Any suitable brake may be used. The treadles need not necessarily be placed on the main-wheel shaft, if a wheel of extra diameter is needed.

This machine, it is believed, combines in its construction and operation the essentials of speed, safety, strength, lightness, and simplicity of manipulation.

I claim as my invention—

1. In a bicycle, a fixed or non-pivoted main fork and a main wheel mounted therein, and having friction-wheels revolving therewith, combined with an upper system of frictional gear, and a perch or backbone attached to and having vertical movement with the shaft of the upper wheels of the system or crank-shaft, substantially as set forth.

2. The combination, in a bicycle, of a main wheel, a system of grooved and elastic tired friction-gears communicating motion to the main wheel through the hub or axle thereof, and hand-cranks, substantially as set forth.

3. In a bicycle, a main non-pivoted fork and a driving-wheel supported thereby, combined with treadles pivoted and provided with arms, as described, and springs attached to the main fork and bearing against said arms, substantially as set forth.

4. In a bicycle, a main non-pivoted fork, a driving-wheel supported thereby, a perch having a rigid connection made by rods $c$, between its lower end and the lower end of the main fork, treadles pivoted and provided with arms, as described, and springs attached to the main fork and bearing against said arms, combined with a rear steering-wheel mounted in a fork vertically pivoted in the rear end of the perch, and jointed rod-connections between the shaft of the steering-wheel and the arms of the treadles, substantially as set forth.

5. The combination, in a bicycle, of a main non-pivoted fork, a main carrying-wheel, a system of frictional gear in bearings vertically movable in the main fork, hand-cranks, a perch attached to the hand-crank shaft and depressible therewith, a rigid connection between the bottom of the main fork and the bottom of the perch, and a rear steering-wheel supported by the perch and operated by foot-treadles and rod-connections, substantially as set forth.

In testimony whereof I have hereunto set my hand this 22d day of May, A. D. 1883.

DE LANCY KENNEDY.

Witnesses:
  GEORGE H. HOWARD,
  W. T. COLE.